(12) United States Patent
Sharbaf et al.

(10) Patent No.: US 11,016,661 B2
(45) Date of Patent: May 25, 2021

(54) DEVICE AND METHOD FOR DISPLAYING CHANGEABLE ICONS ON A PLURALITY OF DISPLAY ZONES OF A REVERSE KEYBOARD ASSEMBLY

(71) Applicant: Finetune Technologies Ltd., Beit Alfa (IL)

(72) Inventors: Shimon Sharbaf, Beit Alfa (IL); Moria Benami, Nitsan (IL)

(73) Assignee: Finetune Technologies Ltd., Beit Alfa (IL)

(*) Notice: Subject to any disclaimer, the term of this patent is extended or adjusted under 35 U.S.C. 154(b) by 0 days.

(21) Appl. No.: 16/105,469

(22) Filed: Aug. 20, 2018

(65) Prior Publication Data

US 2018/0356978 A1 Dec. 13, 2018

Related U.S. Application Data

(63) Continuation-in-part of application No. 15/677,420, filed on Aug. 15, 2017.
(Continued)

(51) Int. Cl.
*G06F 3/0488* (2013.01)
*G06F 3/0481* (2013.01)
*G06F 3/041* (2006.01)

(52) U.S. Cl.
CPC .......... *G06F 3/04886* (2013.01); *G06F 3/041* (2013.01); *G06F 3/04817* (2013.01); *G06F 2203/04809* (2013.01)

(58) Field of Classification Search
CPC ................... G06F 1/1669; G06F 2203/04809
See application file for complete search history.

(56) References Cited

U.S. PATENT DOCUMENTS 6,121,960 A 9/2000 Carroll et al.
6,243,080 B1 * 6/2001 Molne .................. G06F 3/03547
345/157
(Continued)

FOREIGN PATENT DOCUMENTS

JP 2001216077 A 8/2001
RU 2360277 C2 6/2009

OTHER PUBLICATIONS

The International Search Report and the Written Opinion of the International Searching Authority for PCT/US2017/046899, ISA/RU, Moscow, Russia, dated Nov. 30, 2017.
(Continued)

*Primary Examiner* — Priyank J Shah
(74) *Attorney, Agent, or Firm* — M&B IP Analysts, LLC

(57) ABSTRACT

A method for use with a reverse keyboard assembly to display a second set of icons on a second set of display zones of the reverse keyboard assembly based on an input corresponding to a first set of icons placed on a first set of display zones, the method comprising: identifying a first computer program executing on a computer to which the reverse keyboard assembly is communicatively connected to; displaying a first set of icons on the first set of display zones; receiving an input corresponding to one or more icons of the first set of icons; analyzing the input with respect of a set of rules associated with the first computer program; and, displaying a second set of icons on the second set of display zones using a second configuration, the display corresponding to results of the analysis.

19 Claims, 7 Drawing Sheets

Related U.S. Application Data

(60) Provisional application No. 62/547,992, filed on Aug. 21, 2017, provisional application No. 62/375,727, filed on Aug. 16, 2016.

(56) References Cited

U.S. PATENT DOCUMENTS

| | | | |
|---|---|---|---|
| 6,492,978 B1 | 12/2002 | Selig et al. | |
| 2003/0235452 A1 | 12/2003 | Kraus et al. | |
| 2005/0164148 A1 | 7/2005 | Sinclair | |
| 2006/0256090 A1 | 11/2006 | Huppi | |
| 2010/0253634 A1 | 10/2010 | Lin et al. | |
| 2010/0277413 A1* | 11/2010 | Wang | G06F 3/0202 345/168 |
| 2010/0302168 A1* | 12/2010 | Giancarlo | G06F 3/041 345/169 |
| 2011/0157037 A1* | 6/2011 | Shamir | G06F 3/041 345/173 |
| 2011/0260976 A1* | 10/2011 | Larsen | G06F 3/04886 345/168 |
| 2012/0056816 A1 | 3/2012 | Ettinger | |
| 2012/0262309 A1 | 10/2012 | Larsen | |
| 2014/0035823 A1* | 2/2014 | Khoe | G06F 3/0237 345/171 |
| 2014/0143676 A1 | 5/2014 | Tan | |
| 2015/0091804 A1* | 4/2015 | Ito | G06F 3/04883 345/168 |
| 2016/0026383 A1* | 1/2016 | Lee | G06F 3/0488 715/773 |
| 2016/0173664 A1* | 6/2016 | Lewis | G06F 3/0202 455/575.8 |
| 2017/0351420 A1* | 12/2017 | Rigouste | G06F 40/274 |
| 2018/0004305 A1* | 1/2018 | Moseley | G06F 3/0416 |
| 2018/0052523 A1* | 2/2018 | Sharbaf | G06F 3/041 |

OTHER PUBLICATIONS

International Search Report and Written Opinion of International Searching Authority for PCT/US2018/047081, ISA/RU, Moscow, Russia, dated Jan. 17, 2019.

* cited by examiner

DEVICE AND METHOD FOR DISPLAYING CHANGEABLE ICONS ON A PLURALITY OF DISPLAY ZONES OF A REVERSE KEYBOARD ASSEMBLY

CROSS-REFERENCE TO RELATED APPLICATIONS

This application claims the benefit of U.S. Provisional Application No. 62/547,992 filed on Aug. 21, 2017. This application is also a continuation-in-part (CIP) of U.S. patent application Ser. No. 15/677,420 filed on Aug. 15, 2017, now pending, which claims the benefit of U.S. Provisional Application No. 62/375,727 filed on Aug. 16, 2016. All of the applications referenced above are hereby incorporated by reference.

TECHNICAL FIELD

The present disclosure relates generally to computer peripherals, and more specifically to displaying changeable icons on display zones of a reverse keyboard assembly.

BACKGROUND

Keyboards are conventionally used for receiving user input into computers such as PCs, laptops, and the like. A conventional keyboard usually includes keycaps that provide an immediate tactile feedback to a user upon a user pressing thereon. The conventional keyboard is typically composed of multiple rows of permanent keycaps representing different alphanumeric characters and function keys.

Despite the discovery of alternative input devices, such as, e.g., virtual keyboards, typing on a conventional keyboard is the most convenient, common, and efficient way for a user to enter data into a computer system. Therefore, the conventional keyboard remains the most widely used and most versatile peripheral used for direct data input into computers.

The virtual keyboard approach has many benefits, including the ability to dynamically change the display for each key based on context and need. However, critical disadvantages of virtual keyboards include the discomfort some users experience, particularly due to a lack of tactile feedback, the typing deficiencies in cases that require a significant amount of typing data entry, and reduced speed and accuracy of data entry. Additionally, virtual keyboards do not require any physical pressing of keys, which often causes uncertainty for users to determine if the correct key was properly engaged.

Existing keyboard solutions attempt to integrate between a virtual keyboard that includes changeable keys and a conventional keyboard that has traditional, permanent, and physical keycaps where, for example, the keys of the keyboard can be composed on top of a display. However, such solutions still possess significant deficiencies, as a user is often unable to achieve a clear view of the content that is displayed under the keys.

Other types of conventional keyboards may be assembled in a way that the keys are connected to their base structure. However, these solutions can cause the typing experience to be significantly altered from the traditional keyboard typing experience in a way that can cause lack of comfort or ease of use.

Further existing solutions depict adaptable keyboards in which the individual keys can display different characters depending on the need of the user. While allowing the user to appropriately input various characters of data, this solution does not provide any feedback to the user. Therefore, a user cannot be certain that the input request was successfully transmitted in real-time.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a reversed keyboard assembly, comprising: a display; a touch screen disposed on the display; and a top cover disposed on the touch screen, wherein the top cover covers the touch screen and the display, wherein the top cover includes a plurality of transparent keys located at a predetermined distance above the touch screen for enabling a viewing of images displayed on the display.

Certain embodiments disclosed herein also include a method for use with a reverse keyboard assembly to display changeable icons on a plurality of display zones of the reverse keyboard assembly, the method comprising: identifying a first computer program executing on a computer to which the reverse keyboard assembly is communicatively connected to; displaying a first set of icons on at least one display zone of the plurality of display zones using a first configuration, wherein the first set of icons is associated with the first computer program; receiving a request to display of a second set of icons using a second configuration, wherein the first configuration and the second configuration are dissimilar; and, displaying the second set of icons on the at least one display zone using the second configuration, such that at least a portion of the first set of icons is replaced by the second set of icons.

Certain embodiments disclosed herein also include a method for use with a reverse keyboard assembly to display a second set of icons on a second set of display zones of the reverse keyboard assembly based on an input corresponding to a first set of icons placed on a first set of display zones, the method comprising: identifying a first computer program executing on a computer to which the reverse keyboard assembly is communicatively connected to; displaying a first set of icons on the first set of display zones; receiving an input corresponding to one or more icons of the first set of icons; analyzing the input with respect of a set of rules associated with the first computer program; and, displaying a second set of icons on the second set of display zones using a second configuration, the display corresponding to results of the analysis.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
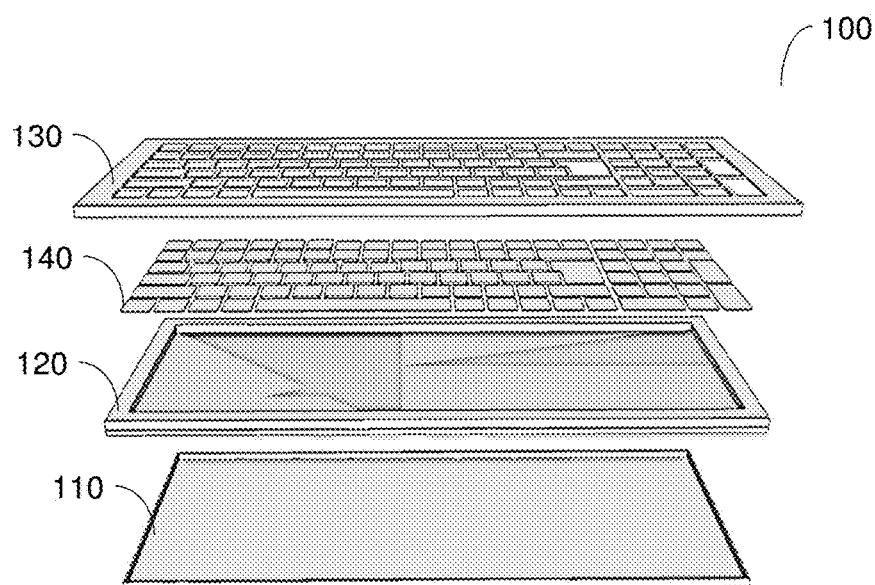
FIG. 1A is an exploded view of a reverse keyboard assembly structured according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A reverse keyboard assembly is communicatively connected to a computer on which a computer program is executed. After the computer program is identified, a first set of icons associated with the computer program is displayed using a first configuration, e.g., on a first set of display zones. Upon receiving a request to perform a display of a second set of icons using a second configuration, the second set of icons is displayed on the keyboard. According to another embodiment, upon displaying the first set of icons, an input corresponding to one or more of the first set of icons is received. The input is analyzed with respect of a set of rules associated with the first computer program, such that a second set of icons is displayed on a second set of display zones.

FIG. 1A shows an example exploded view of the reverse keyboard assembly 100 structured according to an embodiment. The reverse keyboard assembly 100 (hereinafter the "keyboard" 100) includes a display 110, a touch screen 120, a top cover 130, and a plurality of keys 140.

The keyboard 100 is configured such that not all the components are assembled to align on top of each other surrounded by a surrounding frame (not shown in FIG. 1). That is, at illustrated, the display 110 is topped by the touch screen 120, the keys 140 are stacked on the touch screen 130, and the top cover is disposed on the keys 140.

Not shown in FIG. 1A are internal components of the keyboard including, for example, an electrical circuity allowing the operation and electronic connectivity of the keyboard 100, a power source (e.g., batteries), fasteners to fasten each of the four layers together, and elastic members (not shown) to aid in further connecting components and in providing proper key response to its original position after being pressed.

The keyboard 100 may be a wireless keyboard where connectivity to a computer (e.g., a PC) may be achieved over a wireless protocol (e.g., Bluetooth). Alternatively, the keyboard 100 may be a wired keyboard where the connectivity to a computer may be achieved by means of, for example, a universal serial bus (USB) cable, a micro USB cable, a Thunderbolt cable, and the like.

Figure 1B:
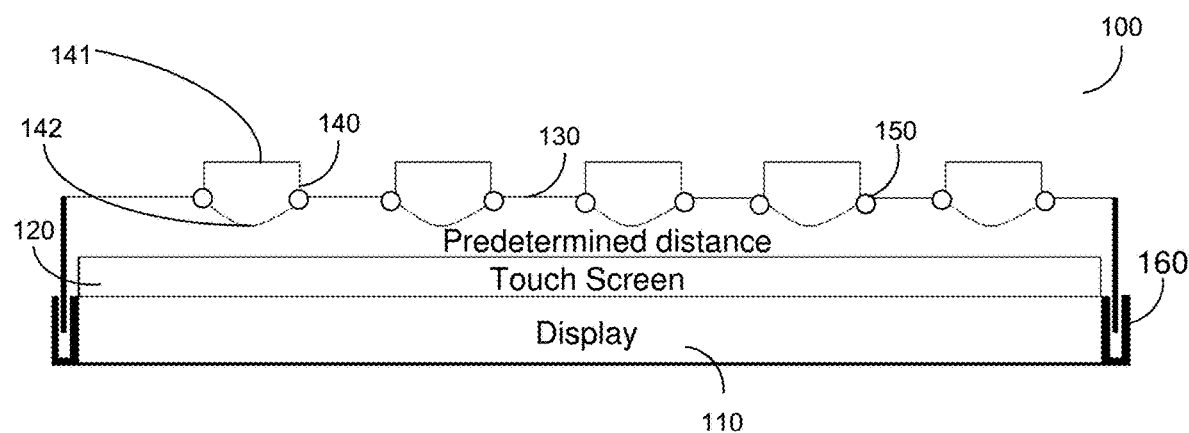
FIG. 1B is a schematic cross-sectional view of the keyboard assembled according to an embodiment.

FIG. 1B shows an example schematic cross-sectional view of the keyboard 100 assembled according to an embodiment. As noted above, the keyboard 100 includes a display 110. The unit 110 is configured to present a variety of content elements, such as symbols or images representing symbols. In an example embodiment, the display 110 is an electronic visual screen, such as for example, a liquid crystal display (LCD) display, an organic light-emitting diode (OLED) display, an electronic ink display, and the like.

According to the disclosed embodiment, the display 110 may be communicatively connected to a computer via wired connection or a wireless connection. Example for wired connection includes a universal serial bus (USB) connection, micro USB connection, Thunderbolt connection, and the like. The wireless connection may be, for example, a Bluetooth connection. In an embodiment, the connection, wired or wireless, used to connect the keyboard to the computer is the same connection used to connect the display 110 to the computer.

The touch screen 120 is disposed on top of display 110. In an example embodiment, the touch screen 120 is configured to achieve identification of a user gesture, such as, for example, a tap, a key press, a swipe, multi-finger scroll, and so on. According to one embodiment, the touch screen 120 may be embedded within the display 110.

A top cover 130 is disposed on the touch screen 120 to cover the touch screen 120 and the display 110. The top cover 130 is a rigid substrate made of, for example, a plastic, metal or a polymeric material, and the like. In an example embodiment, the top cover 130 includes a plurality of transparent, depressible and rigid keys 140. In different embodiment, the keys 140 are not part of the cover 130. In such configuration, the top cover 130 contains apertures for the keys 140 to fit therethrough.

All keys 140 may be assembled on the same surface, and such surface is located in a predetermined distance above the touch screen 120 to enable the viewing of images displayed on the display 110. The plurality of keys 140 may be made of acrylic, glass, or any other transparent material. The predetermined distance may be, for example, 0.1 millimeter (mm), 2 mm, 10 mm, above the touch screen. The distance between a key 140 and the touch screen 120 may be closed by a user pressing over any of the plurality of keys 140 until the key 140 comes in contact with the touch screen 120.

In an embodiment, each of the plurality of keys 140 includes an upper edge 141 and a bottom edge 142. The upper edge 141 is structured to receive the direct contact and pressure from the user's finger, i.e., a user press, and responsive thereto, cause the bottom edge 142 to be pushed down as well. An air layer is located between the top cover 130 and the touch screen 120. At least one connector 150 may be adapted to hold the plurality of keys 140 in a position at which the plurality of keys 140 are not in contact with the touch screen 120 when not in a pressed position.

In an embodiment, such a connector 150 may be a mechanical element, a flexible element, and so on. For example, the connector 150 may be realized as a spring structured to provide a feedback to a user gesture, e.g., a key press. In another embodiment, the connector 150 may be a built-in component of the top cover 130 or an external element. That is to say that based on a user gesture, e.g., a user press, the bottom edge 142 of at least one of the plurality of keys 140 crosses the air layer and touches the touch screen 120.

The keyboard 100 further includes a supporting frame 160. The frame 160 is structured to connect the top cover 130 to the touch screen 120 and the display 110. According to a further embodiment, the top cover 130 may be connected to the frame 160 via at least one axis. The axis enables the top cover 130 to be removed to allow access to the touch screen 120. This access allows a user to clean the touch screen, replace components, and so on.

The frame 160 may be made of a rigid material, such as, but not limited to, metal or hard plastic. The frame 160 is structured to seal the keyboard 100. According to another embodiment, the top cover 130 that includes the plurality of keys 140 may be structured to disengage from the display 110 and the touch screen 120 completely.

According to a further embodiment, the touch screen 120 and the display 110 are communicatively and physically connected and located in proximity to a lower side of the keyboard 100. In this arrangement, the top cover 130 including the plurality of keys 140 is located in proximity to an upper side of the keyboard 100.

The lower side of the keyboard 100 is covered by the frame 160 that enables one to physically connect the lower side and the upper side of the keyboard 100. According to another embodiment, the frame 160 may enable the upper side and the lower side of the keyboard 100 to disengage. According to an embodiment, the lower side and the upper side may be separated by a predetermined distance. The predetermined distance enables the plurality of keys 140, located in the upper side of the keyboard 100, to be physically and communicatively disconnected from the touch screen 120 when no external pressure is applied thereon, i.e., prior to a user gesture, such as a key press or a swipe.

According to an embodiment, the touch screen 120 may be a capacitive touch screen. The capacitive touchscreen panel consists of an insulator such as glass, coated with a transparent conductor. In such an embodiment, the plurality of keys 140 may be composed of a transparent and electrical conductor material, such as for example, indium tin oxide (ITO) that enables one to transfer electrical charge(s). The electrical charge(s) may be transferred through the human body and the conductor key based upon a user gesture, e.g., a user press, and by that the capacitive touch screen identifies the press on a certain key 140 of the plurality of keys 140.

According to another embodiment, the touch screen 120 may be a resistive touch screen. A resistive touchscreen is a touch-sensitive computer display composed of two flexible sheets coated with a resistive material and separated by an air gap or microdots. When contact is made to the surface of the touchscreen, the two sheets are pressed together and enable identification of a precise location of the gesture, i.e., the touch. In such an embodiment, the plurality of keys 140 may be composed of a transparent and isolated material. The isolated material may include, for example, a transparent plastic, polycarbonate, and so on. This enables to insulate the electrical charge(s) under at least one key 140 based upon a user gesture.

According to one embodiment, the touch screen 120 may be an optical touch frame (OTF). The OTF uses light-beams that are radiated from the OTF edges. In case at least one of the light-beams is crossed, the OTF is configured to identify the precise location of the press. For example, the plurality of keys 140 may be assembled on top of the OTF. Based upon a user gesture, e.g., a user press, on at least one of the plurality of keys 140, the light-beams may be crossed by the bottom edge 142 of the key 140 and by that the OTF enables to determine precisely which of the plurality of keys 140 were pressed.

According to another embodiment, the touch screen 120 may be a surface acoustic wave (SAW) touch screen. The SAW touch screen technique uses ultrasonic waves to detect touch events, such as for example a user press, and the location of the user's input. For example, the plurality of keys 140 may be located on top of the SAW touch screen, and based upon a user gesture on at least one of keys 140, the SAWs are absorbed, and the receiving transducers do not register any input. Thus, surface acoustic wave sensors embedded within the SAW touch screen allows for the determination of the location of the touch event.

According to a further embodiment, a plurality of symbols of, for example, letters, numerals, words, signs, and so on may be displayed via the display 110. The displayed symbols may be predetermined and provided by a computer application (not shown). The computer application is a software that is configured to provide to the display 110 a variety of mutable symbols that may be placed under each of the plurality of keys 140. Furthermore, the computer application may be configured to analyze the data collected from the keyboard 100.

According to another embodiment, the keyboard 100 may be preconfigured by a computer application (not shown) to be designated for a variety of usages. For example, a professional keyboard 100 may be preconfigured for medical usages in hospitals, for architects' usage, for professional design usage, and so on.

For example, the keyboard 100 may be designed for medical professionals enabling them to modify the input transmitted via each key of the keyboard in order to more efficiently control a variety of medical devices. The medical devices may include a computed tomography (CT) device, magnetic resonance imaging (MRI) device, and the like which may be configured to receive a plurality of inputs from a medical user.

In another embodiment, the keyboard 100 may be preconfigured to enhance the experience of gamers who play computer video games. For example, through the key that in traditional keyboards represents the letter "Q", the display 110 may display an image of an M-16 rifle to switch weapons more rapidly during gaming. According to the same example, the key that usually represents the letter "A" in traditional keyboards may show therein an image of an AK-47 assault rifle displayed on the display 110, and so on. According to another embodiment, a driver may be used to enable the communication between the keyboard 100 and a computer. The driver is a computer program embedded within the computer that allows it to interact with hardware, such as the keyboard 100.

It should be noted that according to some of the disclosed embodiments, the top cover 130 may be supported by one or more supporting components (not shown). Each of the one or more supporting components may be a rigid material such as for example, plastic, that allow to maintain the predetermined distance between the top cover 130 located on the upper side of the keyboard 100 and the touch screen 120 located on the lower side of the keyboard 100.

According to one embodiment, the one or more supporting components may be mounted on the middle portion and/or on the sides of the top cover 130, which can allow the touch screen 120 to identify user gestures without intervening in the operation of the system 100. According to another embodiment, the one or more supporting components may be mounted on the lower side of the keyboard 100.

Figure 2:
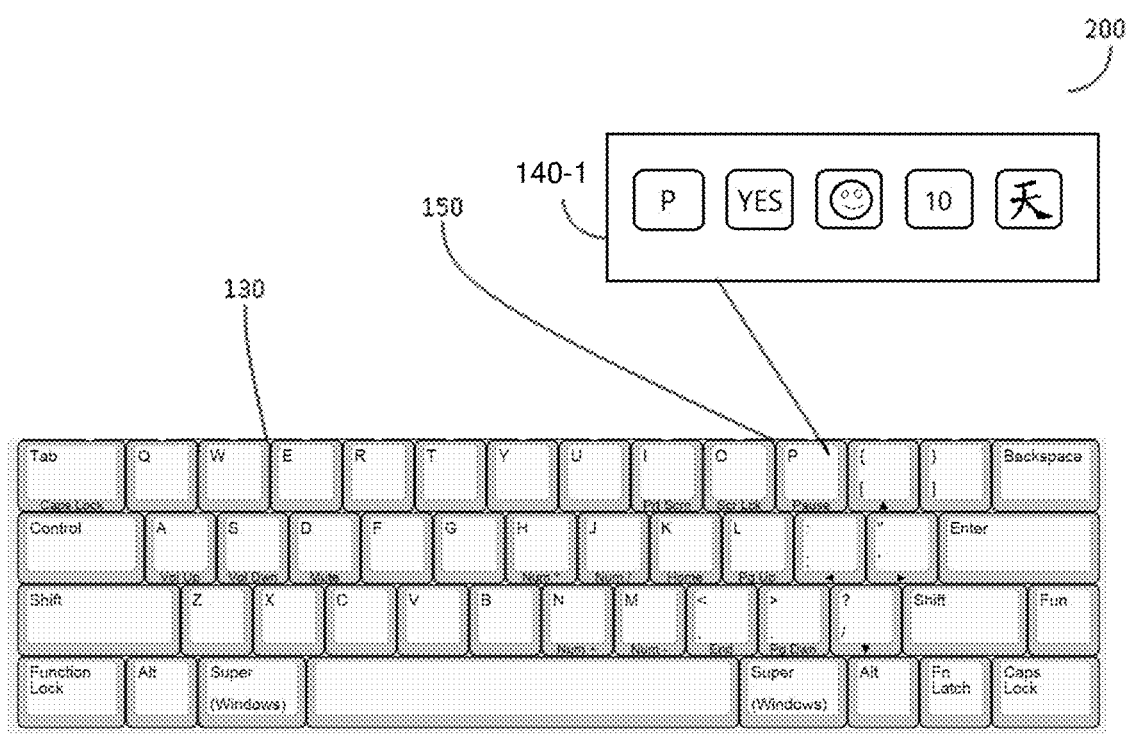
FIG. 2 is a top view of the top cover of the keyboard according to an embodiment

FIG. 2 is an example top view simulation 200 of the top cover 130 of the keyboard 100 according to an embodiment. The plurality of keys 140 are presented from a top view. The plurality of keys 140 are physically connected to the top cover 130 via the at least one connector 150. The plurality of keys 140 may be made of a transparent, depressible and rigid material that enables the user of the computer device to see the mutable images displayed on the display 110 below.

As a non-limiting example, the keyboard 100 may include a plurality of keys 140, i.e., 140-1 through 140-$m$, where m is the integer representing the number of keys on the keyboard 100. The key 140-1 may be structured to enable a user of a computer device to see different and mutable images that are displayed via the display 110 through the touch screen 120 and the key 140-1 itself. Such images may be for example, as shown: the letter "P", the word "YES", a "smiley face", the number "10", a Chinese letter, and the like. It should be noted that the keyboard 100 may be able to display via the display 110 and the other components of the keyboard 100 many images that may be displayed on the center of each of the plurality of keys 140.

Figure 3:
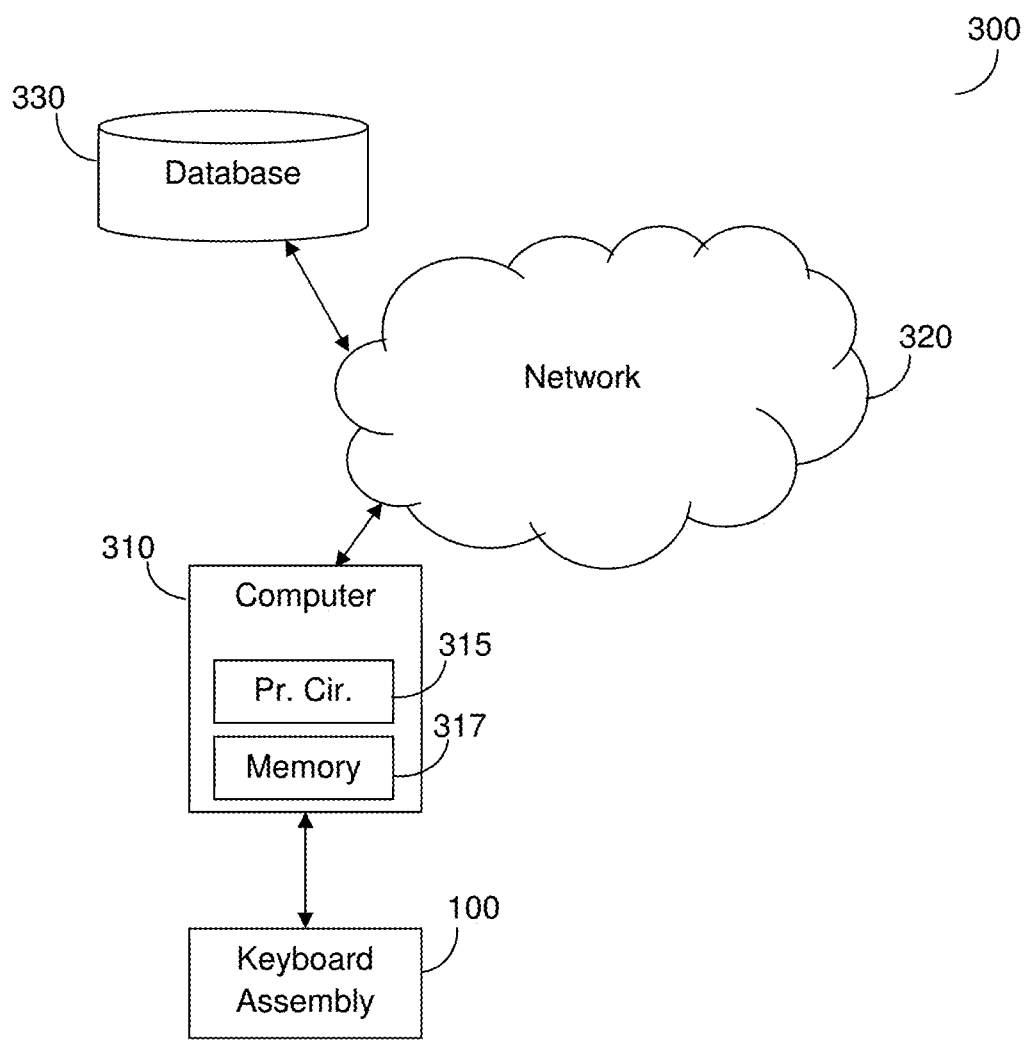
FIG. 3 is a block diagram of a system of a reverse keyboard assembly to display changeable icons on a plurality of display zones according to an embodiment.

FIG. 3 is a schematic block diagram of a system 300 for use with a reverse keyboard assembly to display changeable icons on a plurality of display zones of the reverse keyboard assembly according to an embodiment. The system 300 includes the reverse keyboard assembly 100 (hereinafter: "the keyboard 100"). The keyboard 100 comprises several components as further described herein above with respect of FIG. 1. The components of the keyboard 100 enable multi-purpose usage, as each of the plurality of keys allows to enter a plurality of different values.

The system 300 further includes a computer 310. The computer 310 includes computer hardware and software components configured to execute predetermined computing tasks. The computer 310 comprises a processing circuitry 315 and a memory 317. The memory 317 contains therein instructions that when executed by the processing circuitry 325 configure the computer 310 to execute actions as further described herein below. The keyboard assembly 100 may be communicatively connected to the computer 310 via wired or wireless communication means.

The processing circuitry 315 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 317 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 317 to perform the various processes described herein. Specifically, the instructions, when executed, cause the processing circuitry 315 to manipulate the image shown on the display of the keyboard in areas corresponding to various keys, as discussed hereinabove.

The computer 310 may be communicatively connected to a network 320. The network 320 may enable communication between the different elements of the system 300 communicatively coupled to the network 320. The network 320 may be a local area network (LAN), wide area network (WAN), metro area network (MAN), the Internet, the worldwide web (WWW), and the like.

The system 300 may further include a database 330 communicatively connected to the computer 310 via the network 320. The database 330 may be a data warehouse, a cloud database, etc. designed to store therein data related to content displayed on display zones of the display 110 of the keyboard 100 as further described herein below.

According to an embodiment, a first computer program that is executed on the computer 310 to which the keyboard 100 is connected, is identified by, for example, the processing circuitry 315. Upon identification of the first computer program, the computer 310 displays a first set of icons on at least one display zone of a plurality of display zones using a first configuration. The first set of icons may be associated with the first computer program and may include a plurality of icons, i.e. symbols that are considered most desirable. The plurality of display zones are portions of the display 110 used for displaying changeable icons, i.e. symbols. Each display zone may be located beneath a key 140. The first configuration is an initial layout of the icons on the plurality of display zones as determined by the developers of the first computer program.

The computer 310 may be configured to receive a request to perform a display of a second set of icons using a second configuration. The second set of icons may include icons that were not included in the first set of icons. The second set of icons may be selected by a user according to the user's preferences. The selection may be achieved using the first computer program executing on the computer 310. The first configuration and the second configuration may be dissimilar such that at least part of the keys 140 are located in different display zones.

The computer 310 may be further configured to display the second set of icons on the at least one display zone using the second configuration, such that at least a portion of the first set of icons is replaced by the second set of icons.

For example, when Adobe® Photoshop® software is identified as the application that currently displayed on a computer screen, a predetermined set of icons associated with the Adobe® Photoshop® software is displayed on the plurality of display zones. After the computer 310 receives a request to change the layout and at least one of the displayed icons, a second set of icons is displayed on the plurality of display zones. The second set of icons may be displayed in accordance with a user's preference.

Figure 4:
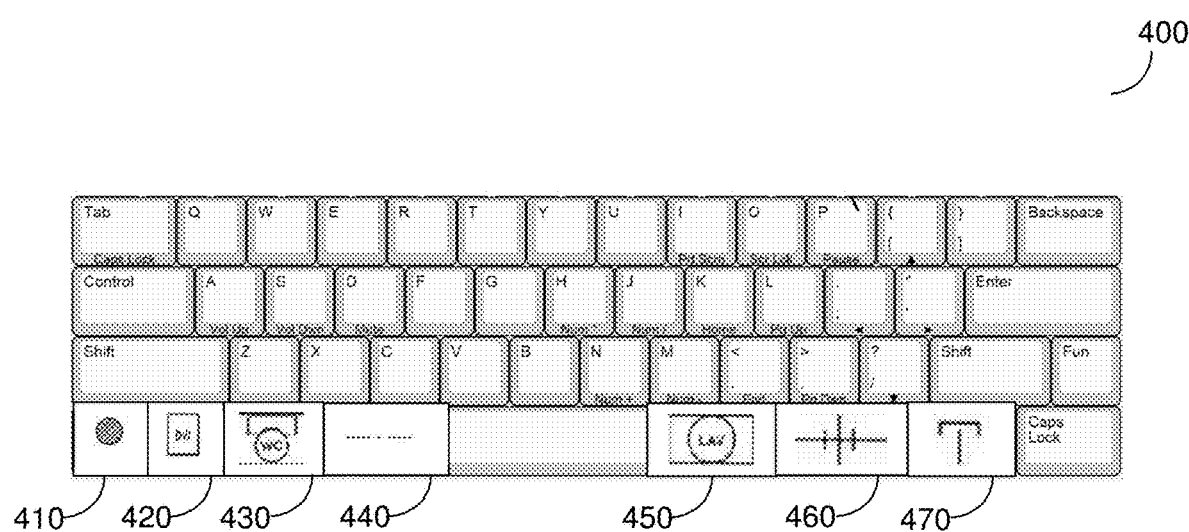
FIG. 4 is a top view of a reverse keyboard assembly displaying a first set of icons and a second set of icons on a plurality of display zones according to an embodiment.

FIG. 4 depicts a non-limiting example of a top view 400 of a reverse keyboard assembly displaying a first set of icons and a second set of icons on a plurality of display zones according to an embodiment. The reverse keyboard assembly, i.e., the keyboard 100, is configured to display the first set of icons such as the icons displayed on the plurality of display zones placed beneath the keys 140 that are associated with a first computer program. According to the implementation described in FIG. 4, the computer 310 identifies that an AutoCAD® software was initiated and therefore an initial first set of icons, i.e. symbols that was preconfigured is displayed on the plurality of display zones beneath the plurality of keys 140.

For example, the first set of icons may include at least the icon 410 that represents floor drain symbol, icon 420 that represents dish washer, icon 430 that represents water closet, icon 440 that represents cold water, etc. According to the same example, these icons 410 through 440 and other icons may be preconfigured by the software's developers to be the default set of icons. It should be clear that the icons 410 through 440 are mentioned as an example and the first set of icons may be placed beneath each of the plurality of keys 140 of the keyboard 100.

According to a further example, the icon 450 that represents lavatory, the icon 460 that represents union, the icon 470 that represents cap, etc. may not be included in the first set of icons. However, since the user associated with the keyboard 100 prefer that these icons will be available on the keyboard 100, a request to display the icons 450 through the icons 470 is received and therefore the second set of icons is displayed. In an embodiment, once the request is received, the second set of icons may become part of a default set of icons.

According to a further embodiment, each icon of the second set of icons may display a command that, when entered using a traditional keyboard, requires pressing on multiple keys simultaneously. For example, in order to send a document for printing when using a traditional keyboard, many programs require a user to press on "Ctrl" key and the "P" key together. According to the same example, when using the keyboard 100, the second set of icons may include a predefined icon that includes the abovementioned combination and therefore presents only an icon of a printer, the word "Print", etc.

Figure 5:
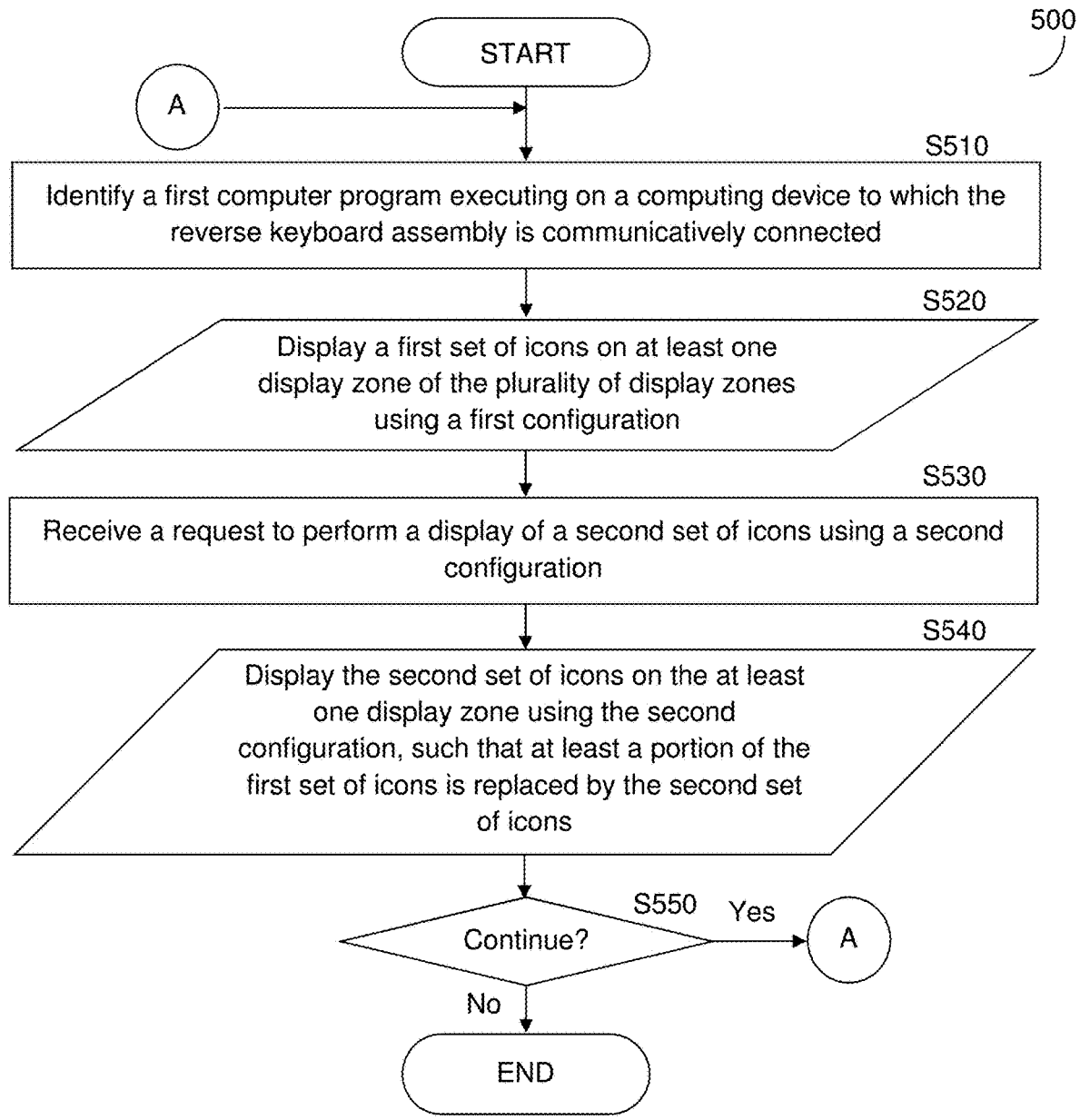
FIG. 5 is an exemplary flowchart of a method for displaying changeable icons on a plurality of display zones on a reverse keyboard assembly according to an embodiment.

FIG. 5 depicts an exemplary and non-limiting flowchart 500 of a method for use with a reverse keyboard assembly to display changeable icons on a plurality of display zones of the reverse keyboard assembly according to an embodiment. At S510, a first computer program is identified. The first computer program is executed on a computer 310 to which the reverse keyboard assembly 100 (hereinafter: "the keyboard 100") is communicatively connected. In an embodiment, it is further identified if the program is not only being executed, but is also currently the program that is in focus, e.g., when compared to other programs running simultaneously on the computer.

At S520, a first set of icons is displayed on at least one display zone of the plurality of display zones using a first configuration, where the first set of icons is associated with the first computer program.

At S530, a request to perform a display of a second set of icons using a second configuration is received, where the first configuration and the second configuration are dissimilar.

At S540, the second set of icons is displayed on the at least one display zone using the second configuration, such that at least a portion of the first set of icons is replaced by the second set of icons. At S550, it is checked whether to continue the operation and if so, execution continues with S510; otherwise, execution terminates.

Figure 6:
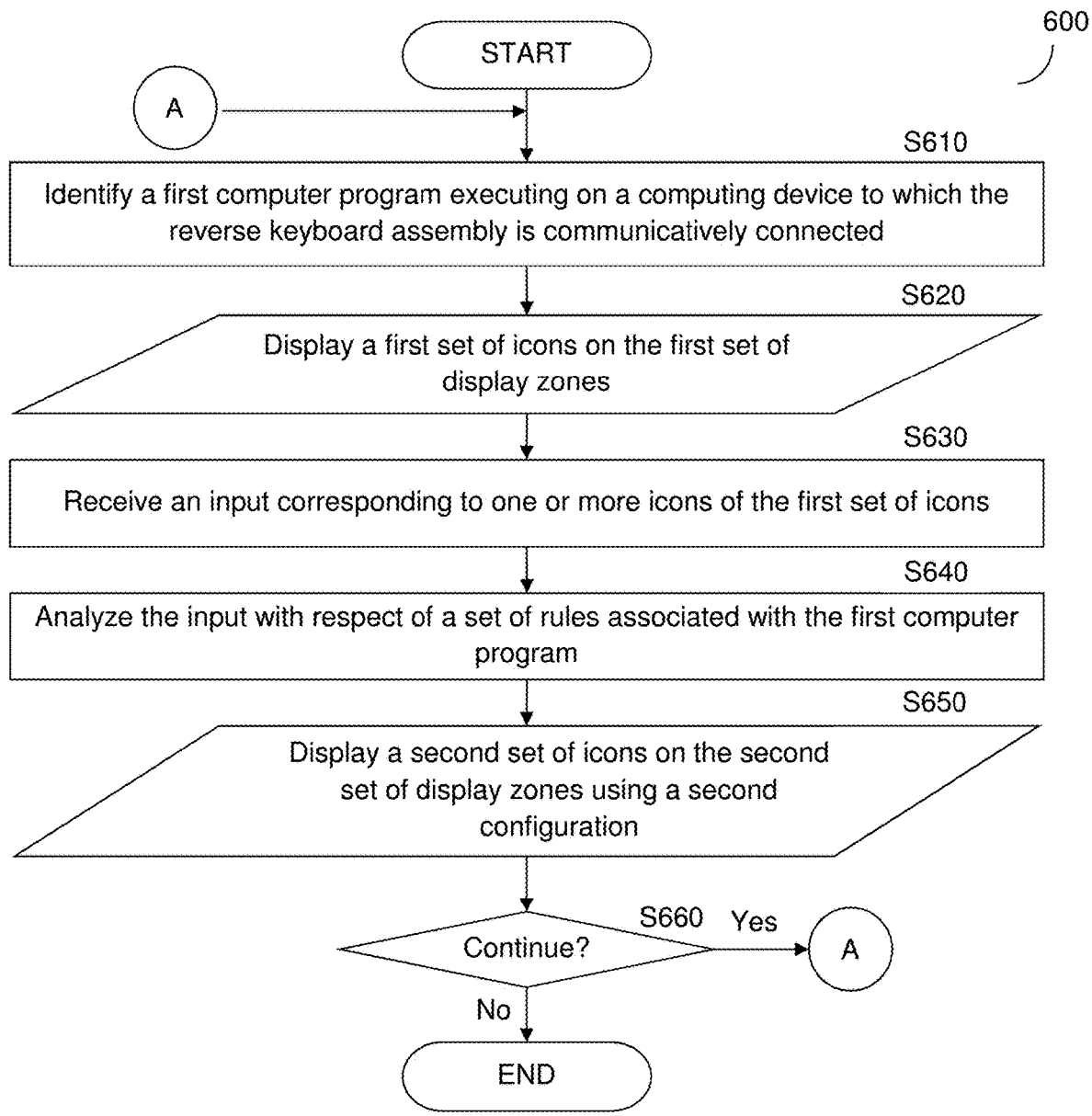
FIG. 6 is an exemplary flowchart of a method of displaying a second set of icons on a second set of display zones of a reverse keyboard assembly according to an embodiment.

FIG. 6 depicts an exemplary and non-limiting flowchart of a method for use with a reverse keyboard assembly to display a second set of icons on a second set of display zones of the reverse keyboard assembly based on an input corresponding to a first set of icons placed on a first set of display zones, according to an embodiment. At S610, a first computer program is identified. The first computer program is executed on a computer 310 to which the reverse keyboard assembly 100, i.e., the keyboard 100, is communicatively connected. The identification may be achieved using the processing circuitry 315 of FIG. 3.

At S620, the computer 310 displays a first set of icons on the first set of display zones. The first set of icons may be associated with the first computer program and may include a plurality of icons, i.e. symbols related thereto. The plurality of display zones are portions of the display 110 used for displaying changeable icons, i.e. symbols. Each display zone may be located beneath a key 140.

At S630, an input corresponding to one or more icons of the first set of icons is received. The input may be may be for example a signal transmitted from at least one display zone to the computer 310 upon identification of a user gesture, i.e., a user press on a key 140. The input may include, for example, the content, i.e., the icon placed within a single display zones, such as a single letter, a combination of letters in any kind of language, numbers, symbols, and so on.

At S640, the input is analyzed with respect of a set of rules associated with the first computer program. The set of rules associated with the first computer program indicates the result of an input received from the first set of icons. As a non-limiting example, when the first computer program is a software configured to facilitate Chinese typing and the received input indicates that the icon including the letters "N" and "I" were triggered, the set of rules associated with the abovementioned software is used to analyze the input. According to the same example, upon analyzing the input of the letters "N" and "I" with a first set of rules, the second set of icons displays a suggested word such as "很好" which means "Hello" in Chinese. To this end, the second set of icons presents one or more suitable character for the diction that was entered using the first set of icons.

At S650, a second set of icons, which is corresponding to results of the analysis, is displayed on the second set of display zones using a second configuration. The first configuration and the second configuration are dissimilar, which means that the layout of the first set of icons is different from the layout used for displaying the second set of icons.

As another non-limiting example, the set of rules associated with a certain computer program indicates that in case the letters "H", "E" and "N" were entered, at least one of the seconds set of icons that will be displayed on the second set of display zones may include the word "很好" in Chinese which means "well". The second configuration and at least a portion of the first configuration may be displayed simultaneously. The second configuration may use one or more of the display zones, thus some predetermined icons of the first set of icons may still be displayed for enabling typing every letter, symbol, etc. At S660, it is checked whether to continue the operation and if so, execution continues with S610; otherwise, the execution terminates.

The implementation of the invention described herein above allows for the enhancement of a typing experience of users using the Chinese language. The enhancement is achieved by displaying on a second set of icons displayed on the keyboard 100, one or more suitable characters in response to an input received from a first set of icons that are also displayed on the keyboard 100. This improvement enables faster and more pleasant typing experience, particularly with languages having more characters than are present on a standard keyboard layout.

Figure 7:
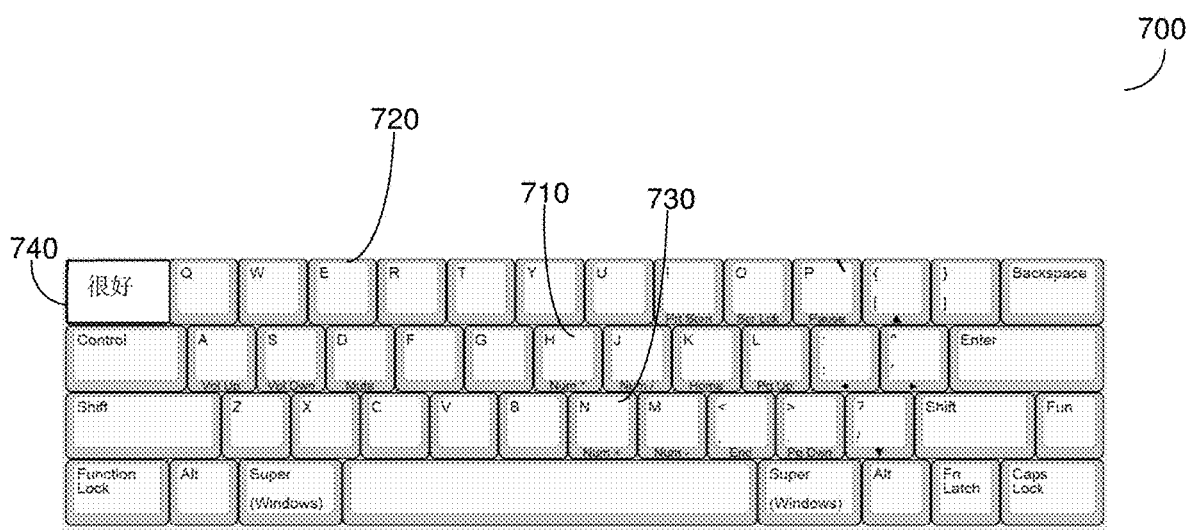
FIG. 7 a top view of a reverse keyboard assembly displaying a first set of icons and a second set of icons on a plurality of display zones according to an embodiment.

FIG. 7 depicts a non-limiting example of a top view 700 of a reverse keyboard assembly displaying a first set of icons and a second set of icons on a plurality of display zones according to an embodiment. FIG. 7 demonstrates an implementation of one of the uses that can be executed using the method described in FIG. 6.

According to an embodiment, a computer program that executes on the computer 310 may be used for facilitating Chinese typing. The revere keyboard assembly 100 may display only the first set of icons in the first place, i.e., the letters displayed in English. After receiving an input corresponding to one or more of the English letters, the computer 310 causes the display zones located beneath the keys 140 to display a second set of icons in a second configuration. For example, after the letter "H" displayed on icon 710, the letter "E" displayed on icon 720 and "N" displayed on icon 730 were entered, at least one of the seconds set of icons, such as icon 740, displayed on the second set of display zones, may include the word " 很好 " in Chinese which means "well".]

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processing circuitry is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for use with a reverse keyboard assembly to display changeable icons on a plurality of display zones of the reverse keyboard assembly, the method comprising:

identifying a first computer program executing on a computer to which the reverse keyboard assembly is communicatively connected;

displaying a first set of icons on at least one display zone of the plurality of display zones using a first configuration when the first computer program is in focus on the computer, wherein the first set of icons is associated with the first computer program, wherein the reverse keyboard assembly includes a display, a touch screen disposed on the display, a plurality of transparent and rigid keys, and a top cover disposed on the touch screen, wherein the top cover covers the touch screen and the display, wherein the plurality of transparent and rigid keys is located at a predetermined distance above the touch screen for enabling viewing of images displayed on the display unit wherein the top cover includes a plurality of apertures for the plurality of transparent and rigid keys, wherein each of the plurality of transparent and rigid keys is disposed in one of the plurality of apertures such that the predetermined distance is gapped by one of the plurality of transparent and rigid keys when force is exerted thereon, wherein the reverse keyboard assembly further comprises a connector, wherein the connection between each of the plurality of keys and the top cover is achieved by the connector;

receiving a request to display a second set of icons using a second configuration, wherein the first configuration and the second configuration are dissimilar; and, displaying the second set of icons on the at least one display zone using the second configuration, such that at least a portion of the first set of icons is replaced by the second set of icons.

2. The method of claim 1, wherein the keyboard assembly has a lower side and an upper side, wherein the touch screen and the display are electrically and physically connected and located in the lower side of the keyboard assembly.

3. The method of claim 2, wherein the top cover is located in the upper side of the keyboard assembly.

4. The method of claim 2, wherein the lower side and the upper side are separated by a predetermined distance.

5. The method of claim 4, wherein the plurality of keys is physically and electronically disconnected from the touch screen and the display when no external pressure is applied thereto.

6. The method of claim 2, wherein the keyboard assembly further comprises a supporting frame structured to cover the lower side of the keyboard assembly.

7. The method of claim 6, wherein the supporting frame is structured to physically connect the upper side and the lower side of the keyboard assembly.

8. The method of claim 6, wherein the supporting frame is structured to disengage the upper side and the lower side of the keyboard assembly.

9. The method of claim 1, wherein the top cover is made of a rigid material.

10. The method of claim 1, wherein each of the plurality of keys includes an upper edge and a bottom edge.

11. The method of claim 10, wherein, upon a key press on the upper edge of one of the plurality of keys, the bottom edge of the key touches the touch screen.

12. The method of claim 11, wherein the keyboard assembly further includes an optical touch frame configured to generate a light beam and at least one sensor, wherein upon a key press on the upper edge of one of the plurality of keys, the bottom edge of the key crosses the light beam generated by the optical touch frame, wherein upon identification of a crossing of the light beam identified by one of the at least one sensor, the location of the key press is identified.

13. The method of claim 1, wherein the connector holds the plurality of keys in a position separating the plurality of keys from the touch screen.

14. A method for use with a reverse keyboard assembly to display a second set of icons on a second set of display zones of the reverse keyboard assembly based on an input corresponding to a first set of icons placed on a first set of display zones, the method comprising:
   identifying a first computer program executing on a computer to which the reverse keyboard assembly is communicatively connected;
   displaying a first set of icons on the first set of display zones, wherein the reverse keyboard assembly includes a display, a touch screen disposed on the display, a plurality of transparent and rigid keys, and a top cover disposed on the touch screen, wherein the top cover covers the touch screen and the display, wherein the plurality of transparent and rigid keys is located at a predetermined distance above the touch screen for enabling viewing of images displayed on the display unit wherein the top cover includes a plurality of apertures for the plurality of transparent and rigid keys, wherein each of the plurality of transparent and rigid keys is disposed in one of the plurality of apertures such that the predetermined distance is gapped by one of the plurality of transparent and rigid keys when force is exerted thereon, wherein the reverse keyboard assembly further comprises a connector, wherein the connection between each of the plurality of keys and the top cover is achieved by the connector;
   receiving an input corresponding to at least one icon of the first set of icons;
   analyzing the input with respect of a set of rules associated with the first computer program, wherein the set of rules associated with the first computer program indicates the result of an input received from the first set of icons, wherein the set of rules associated with the first computer program indicates at least one suitable character to be displayed based on at least one input character of the analyzed input; and,
   displaying a second set of icons on the second set of display zones using a second configuration, wherein the displayed second set of icons is determined based on the analysis, wherein the second set of icons includes the at least one suitable character.

15. The method of claim 14, wherein the first set of icons is associated with the first computer program.

16. The method of claim 14, wherein the second configuration and at least a portion of the first configuration are displayed simultaneously.

17. The method of claim 14, wherein the first configuration and the second configuration are dissimilar.

18. A non-transitory computer readable medium having stored thereon instructions that, when executed by a processing circuitry, configure the processing circuitry to:
   identify a first computer program executing on a computer to which a reverse keyboard assembly is communicatively connected, the reverse keyboard assembly including a plurality of display zones having respective changeable icons;
   display a first set of icons on at least one display zone of the plurality of display zones using a first configuration, wherein the first set of icons is associated with the first computer program, wherein the reverse keyboard assembly includes a display, a touch screen disposed on the display, a plurality of transparent and rigid keys, and a top cover disposed on the touch screen, wherein the top cover covers the touch screen and the display, wherein the plurality of transparent and rigid keys is located at a predetermined distance above the touch screen for enabling viewing of images displayed on the display unit wherein the top cover includes a plurality of apertures for the plurality of transparent and rigid keys, wherein each of the plurality of transparent and rigid keys is disposed in one of the plurality of apertures such that the predetermined distance is gapped by one of the plurality of transparent and rigid keys when force is exerted thereon; wherein the reverse keyboard assembly further comprises a connector, wherein the connection between each of the plurality of keys and the top cover is achieved by the connector;
   receive a request to display a second set of icons using a second configuration, wherein the first configuration and the second configuration are dissimilar; and,
   display the second set of icons on the at least one display zone using the second configuration, such that at least a portion of the first set of icons is replaced by the second set of icons.

19. A non-transitory computer readable medium having stored thereon instructions that, when executed by a processing circuitry, configure the processing circuitry to:
   identify a first computer program executing on a computer to which a reverse keyboard assembly is communicatively connected, the reverse keyboard assembly having a first set of display zones and a second set of display zones;
   display a first set of icons on the first set of display zones, wherein the reverse keyboard assembly includes a display, a touch screen disposed on the display, a plurality of transparent and rigid keys, and a top cover disposed on the touch screen, wherein the top cover covers the touch screen and the display, wherein the plurality of transparent and rigid keys is located at a predetermined distance above the touch screen for enabling viewing of images displayed on the display unit wherein the top cover includes a plurality of apertures for the plurality of transparent and rigid keys, wherein each of the plurality of transparent and rigid keys is disposed in one of the plurality of apertures such that the predetermined distance is gapped by one of the plurality of transparent and rigid keys when force is exerted thereon, wherein the reverse keyboard assembly further comprises a connector, wherein the connection between each of the plurality of keys and the top cover is achieved by the connector;
   receive an input corresponding to one or more icons of the first set of icons;
   analyze the input with respect of a set of rules associated with the first computer program; and,
   display a second set of icons on the second set of display zones using a second configuration, the display corresponding to results of the analysis.

* * * * *